[11] 3,576,359

| | | | |
|---|---|---|---|
| [72] | Inventor | Harry Jose Cosh | |
| | | East Bentleigh, Victoria, Australia | |
| [21] | Appl. No. | 836,022 | |
| [22] | Filed | June 24, 1969 | |
| [45] | Patented | Apr. 27, 1971 | |
| [32] | Priority | June 25, 1968 | |
| [33] | | Australia | |
| [31] | | 39695 | |

[54] PLURAL MOTOR-DRIVEN MIRROR
10 Claims, 8 Drawing Figs.

[52] U.S. Cl.............................................. 350/289,
310/12, 318/38, 335/268
[51] Int. Cl............................................................ G02b 5/08
[50] Field of Search........................................... 310/12-
—14, 34, 35; 335/268, 270; 318/35—38, 135;
350/289

[56] References Cited
UNITED STATES PATENTS

| | | | | |
|---|---|---|---|---|
| 2,638,035 | 5/1953 | MacGeorge et al. | ......... | 350/289 |
| 3,273,727 | 9/1966 | Rogers et al. | ................. | 310/13X |
| 3,286,545 | 11/1966 | Malachowski | ................. | 350/289X |
| 3,376,578 | 4/1968 | Sawyer | .......................... | 335/268X |
| 3,457,482 | 7/1969 | Sawyer | .......................... | 318/38 |

*Primary Examiner*—D. F. Duggan
*Attorney*—Oberlin, Maky, Donnelly & Renner

ABSTRACT: Apparatus is provided for producing relative movement between a supporting member and a workpiece, for example, automobile equipment such as a rear view mirror, responsive to control from a remote position. A movement transmitting plate is mounted for movement on the supporting member and is displaced by a plurality of electric motor, responsive to remote control, relative to the supporting member. The workpiece is thereafter moved in a plane normal to the plane of the supporting member into engagement with the displaced transmitting plate. Means are provided in response to such engagement for causing movement of the transmitting plate in a direction opposite its original displacement thereby imparting a corresponding relative motion to said workpiece.

PATENTED APR 27 1971 3,576,359

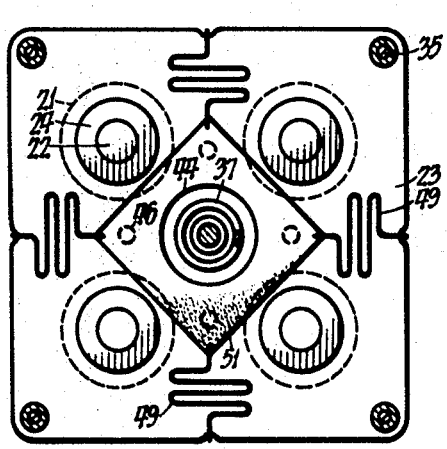
Fig. 3
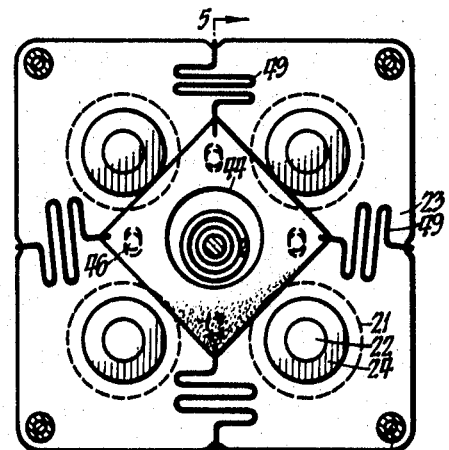
Fig. 4
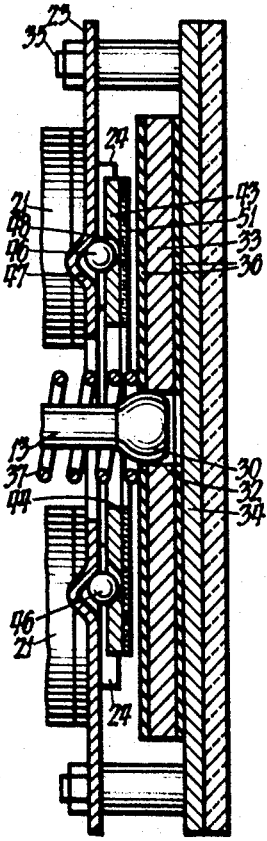
Fig. 5
Fig. 6

PLURAL MOTOR-DRIVEN MIRROR

This invention relates to improvements in apparatus for producing relative motion between workpiece and a supporting member and relates particularly to apparatus which is operable to produce relative motion in a steplike manner in a desired predetermined direction.

The invention has been devised with the object of providing a relatively cheap and simple means of producing relative movement between a workpiece and a supporting member, which movement is controllable from a remote position to produce a movement of the workpiece relative to the support member in predetermined desired direction parallel to the plane of the support member.

It is a further object of the invention to provide apparatus of the above type wherein the degree of movement for each operation is predetermined so that the workpiece is moved in a steplike manner.

It is a more particular object of the invention to provide an electromechanical remote controlled system for adjustment of automotive rear view mirrors, headlights, and other movable or adjustable automotive equipment.

It is known that users of vehicles, particularly motor vehicles have difficulties in adjusting, and maintaining in adjustment, various pieces of equipment on the vehicles. Externally and internally located rear view mirrors are often moved from their set position and require adjustment regularly. Also, it has become evident that headlights of modern motor vehicles should be adjusted to direct their light beams onto the roadway when such vehicles are heavily loaded. Such headlight adjustment is particularly desirable when the rear of the vehicle is loaded to an extent that the normally dipped headlight beam is projected almost horizontal to the roadway.

According to one aspect of the invention there is provided apparatus for producing relative motion of a workpiece comprising a supporting member, a movement transmitting plate mounted on said supporting member, means for displacing the transmitting plate relative to the supporting member, means to move a workpiece substantially perpendicular to the plane of the supporting member when the transmitting plate is displaced so that the workpiece engages with said transmitting plate, and means associated with the transmitting plate to cause relative motion thereof in a direction opposite its displacement when engaged by the workpiece to thereby impart a corresponding relative motion to said workpiece.

The movement transmitting plate may comprise a plate mounted on the supporting member by means of spherical bearings and held thereto by suitable spring means, or it may comprise a domed washer with the edge portions thereof in contact with the supporting member.

The means for moving the transmitting plate are preferably magnetic means mounted at desired positions adjacent the transmitting plate and selectively operable to attract the magnetic plate in a particular direction. It is also envisaged, however, that the means for displacing the transmitting plate may be mechanical or hydraulically operated means.

It is also preferred that the means to move the workpiece toward the supporting member comprise electromagnetic means mounted to said supporting member with associated pole pieces equally spaced around and adjacent said transmitting plate, the electromagnets being selectively energizable to move the transmitting plate as previously described, or being operable together to move the workpiece toward the pole pieces.

The invention has been devised particularly for use in moving rear vision mirrors for automobiles and like vehicles and for adjustable movement of headlights and other equipment in such vehicles.

Thus, the mechanism may be mounted within a rear vision mirror frame or in a headlight housing and the workpiece or the mechanism itself connected to a mirror or headlight to provide means for obtaining control directional movement thereof.

According to a further aspect of the invention there is provided apparatus for producing motion of a workpiece in a predetermined direction comprising a supporting member, at least two electromagnets mounted on said supporting member, said electromagnets having cores extending from one side of and perpendicular to the plane of said supporting member and a coil around each core, pole pieces on the cores and extending from the other side of the supporting member, a rear plate on the free end of the cores spaced from and substantially parallel to the supporting member, a movement transmitting plate mounted substantially parallel to and spaced from said one side of the supporting member by four spherical bearings engaged in depressions in either one of or both the supporting member and the transmitting plate, spring means supporting said transmitting plate in engagement with said bearings, means for supporting said workpiece adjacent to but spaced from said transmitting plate, and electrical switching means for supplying electrical current initially to at least one of the said coils to produce a magnetic field to attract said transmitting plate toward at least one pole piece so that the spherical bearings ride up the depressions, and to then supply electrical current to all said coils simultaneously to attract said workpiece toward said pole pieces so that it engages with said transmitting plate to cause the transmitting plate to return to its original position thereby imparting a corresponding movement to said workpiece.

It is preferred that there be provided four electromagnets equally spaced about the transmitting plate so as to provide four or eight directions of movement of the transmitting plate relative to the supporting member. However, it will be appreciated that two electromagnets only may be mounted one on either side of the transmitting plate to provide linear movement thereof in two directions.

In order that the invention will be more fully described and put into practical form, embodiments thereof will now be described with reference to the accompanying drawings, wherein:

FIG. 3 is a sectional view taken along the lines 3-3 of FIG. 1;

FIG. 4 is a sectional view similar to FIG. 3 but showing the mechanism in an operated position;

FIG. 5 is a sectional side elevational view taken along the lines 5-5 of FIG. 4;

FIG. 6 is a sectional side elevational view showing the mechanism after operation;

Figure 1:
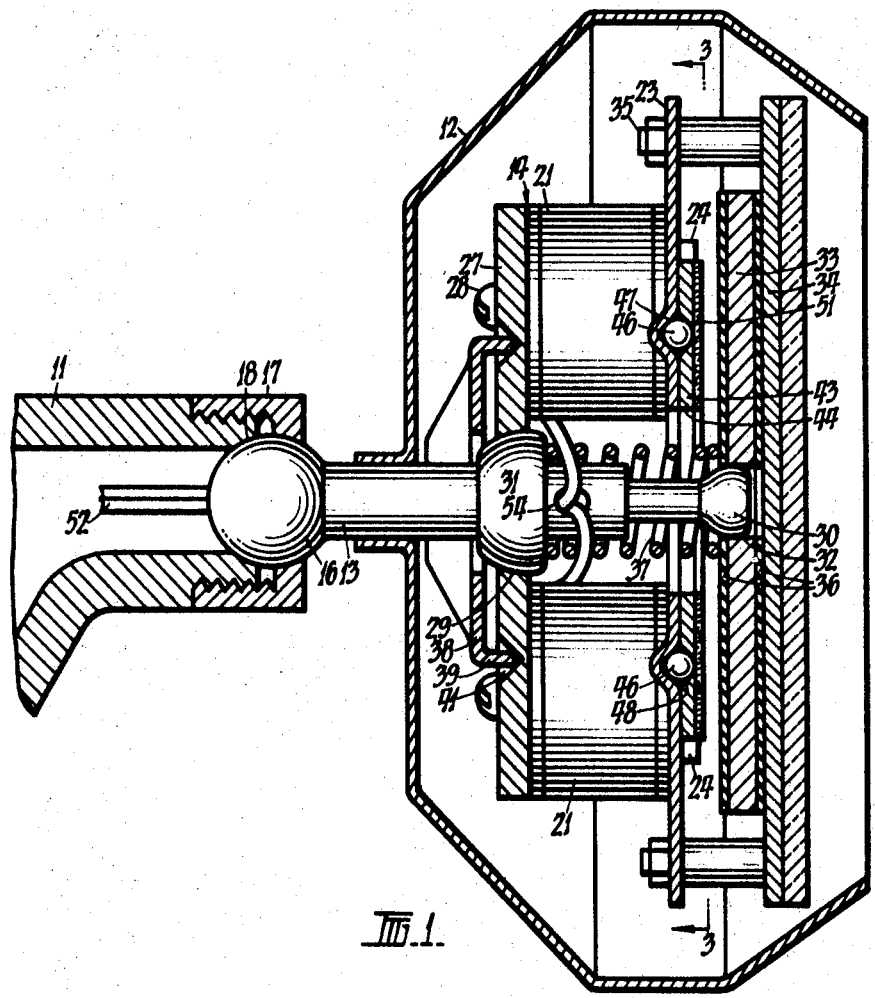
FIG. 1 is a sectional side elevational view of a rear-vision mirror embodying the present invention.
Figure 2:
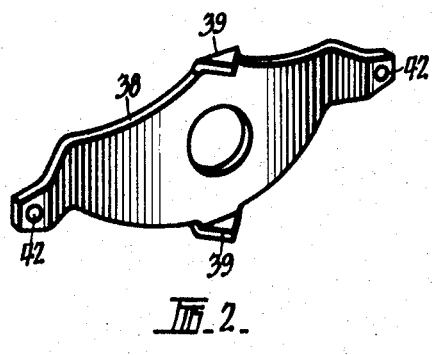
FIG. 2 is a perspective view of a part of the mirror of FIG. 1.

Referring to FIG. 1 to 6 the rear view mirror comprises a mounting support 11 for mounting the mirror to a vehicle, and a mirror surround 12 mounted on a spindle 13 and enclosing an electromechanical mirror moving mechanism 14 which is operatively connected to the spindle 13.

The spindle 13 carries a ball 16 at one end thereof which is located in a socket 18 in the support 11, and a clamping nut 17 threaded on the support 11 is arranged to be tightened against the ball 16 to lock the spindle at any desired angular position relative to the support 11.

The moving mechanism 14 consists of four electromagnets having coils 21 and soft iron cores 22 mounted on one side of a supporting plate 23 which is of nonmagnetic material, for example, aluminum, or an alloy thereof.

Each core 22 passes through an aperture in the plate 23 and a pole piece 24 is fixed to each core 22. The portion of each core passing through the plate 23 may be reduced in diameter to form a shoulder against which the plate 23 is engaged to secure the cores 22 in position.

The plate 23 is formed with a centrally located aperture 26 and the cores 22 are arranged equispaced about this aperture 26.

A common yoke 27 is fixed by screws 28 to the free ends of each core 22, with the coils 21 mounted thereon, and the yoke 27 acts to complete the magnetic circuits of each electromagnet. An aperture having cupped edges 29 is formed centrally in the yoke 27, the edges being adapted to form a seat for a half ball 31 mounted on the spindle 13 which extends through the apertures in the yoke 27 and plate 23.

The free end of the spindle 13 has a ball formation 30 on the end thereof and engages in an axial bore 32 in an armature disc 33 which is located between the pole pieces 24 and a mirror backing 34 fixed to and spaced from the plate 23 by screws 35. The ball 30 engaging in the bore 32 permits axial and angular movement of the armature 33 without radial displacement. The armature disc 33 is faced on either side with a thin layer of material 36 having a high coefficient of friction, for example, rubber, and the disc is held against the mirror backing 34 by a compression spring 37 which is coaxial with the spindle 13 and extends between the disc and the half ball 31. Thus, the spring also loads the ball joint constituted by the half ball 31 and the cupped edges 29.

It will be apparent that the mirror head comprising the mirror backing 34, the plate 23 and yoke 27, the coils 21 and cores 22 may be moved angularly about the ball joint by applying sufficient force to overcome the frictional resistance between the armature disc 33 and the mirror backing 34 and the friction in the ball joint. Rotational movement of the mirror head about the axis of the spindle is restrained by an elongated spring washer 38, shown in FIG. 2, positioned on the spindle 13 between the yoke 27 and the mirror surround 12 and having a lug 39 extending from each side of the washer 38 to engage in depressions 41 formed in the yoke 27 and formations 42 on each end of the washer 38 to engage with retaining means (not shown) on the inner surface of the sides of the mirror surround 12. As the mirror surround 12 is fixed to the spindle 13, the spring washer 38 also provides additional preloading on the ball joint so that when the armature 33 is caused to move away from the mirror backing 34, the force applied by the spring washer 38 will support the mirror head to restrain movement thereof which may otherwise occur due to gravitational or other external forces.

Mounted between the armature disc 33 and the plate 23 and between the pole pieces 24 is a secondary armature member 43 of soft iron or other nonretentive magnetic material having an opening 44 through which the spindle 13 passes. The member 43 rests on four ball bearings 46 which seat in depressions 47 located between and equispaced from the pole pieces 24. The member 43 is formed with corresponding depressions 48 to locate with the balls 46 and is maintained in a central position between the pole pieces 24 by flat springs 49 engaged with the edges of the plate 23. The edges of the member 43 are shaped to fit the corresponding edges of the pole pieces 24 and to be spaced a small distance therefrom. The surface of the member facing the armature 33 is faced with friction material 51, such as an abrasive material, to provide for maximum friction therebetween when in contact.

To operate the mechanism, current is supplied to each of the coils 21 through wires 52 which enter the mechanism through a bore axially in the spindle 13. The wires 52 pass up through the mounting support 11 and enter the end of the spindle 11 through a hole in the ball 16. The wires 52 come out of the spindle 13 through a hole 54 and connect with each of the coils. The other ends of each coil are connected to a common earth.

In operation, current is applied, through suitable switching means, to two adjacent coils 21 simultaneously setting up a magnetic field which attracts the secondary armature member 43 toward the pole pieces 24 of those energized coils as shown in FIG. 4. In moving the small distance between the edges of the member 43 and the edges of the pole pieces, the member 43 rides up on the ball bearings 46 as shown in FIG. 5. The edge surfaces of the member 43 and the pole pieces are preferably coated with a nonmagnetic material to prevent magnetic "sticking." The switching means then causes the other two coils to be energized as well and the armature disc 33 is attracted toward the pole pieces 24 and moves against the action of the springs 37 and engages with the surface of the member 43. The armature disc 33 forces the secondary armature member 43 toward the plate 23 and in so doing causes it to center on the ball bearings 46 and thus move laterally in a direction opposite its initial movement. The frictional material on the engaging surfaces of the armature disc 33 and the member 43 ensure that the lateral movement of the member 43 in centering on the ball bearings 46 causes a corresponding displacement of the armature 33 (see FIG. 6). As this lateral displacement of the armature 33 is relative only to the mirror head, and as the spindle 13, the ball of which undergoes s similar displacement, is fixed to the mounting support 11, the actual movement which occurs is a movement of the mirror head, and thus a mirror carried thereby, in the direction of the initial movement of the member 43 in the mirror surround 12.

When the current supplied to the coils is cut off, the armature 33 is caused to move toward and engage with the mirror backing 34 by the spring 37.

By pulsing the current to the coils 21 in the manner described, the mirror head is caused to move, in steps, through any desired arc, the extent of the arc being limited only by the relative dimensions of the parts.

Figure 7:
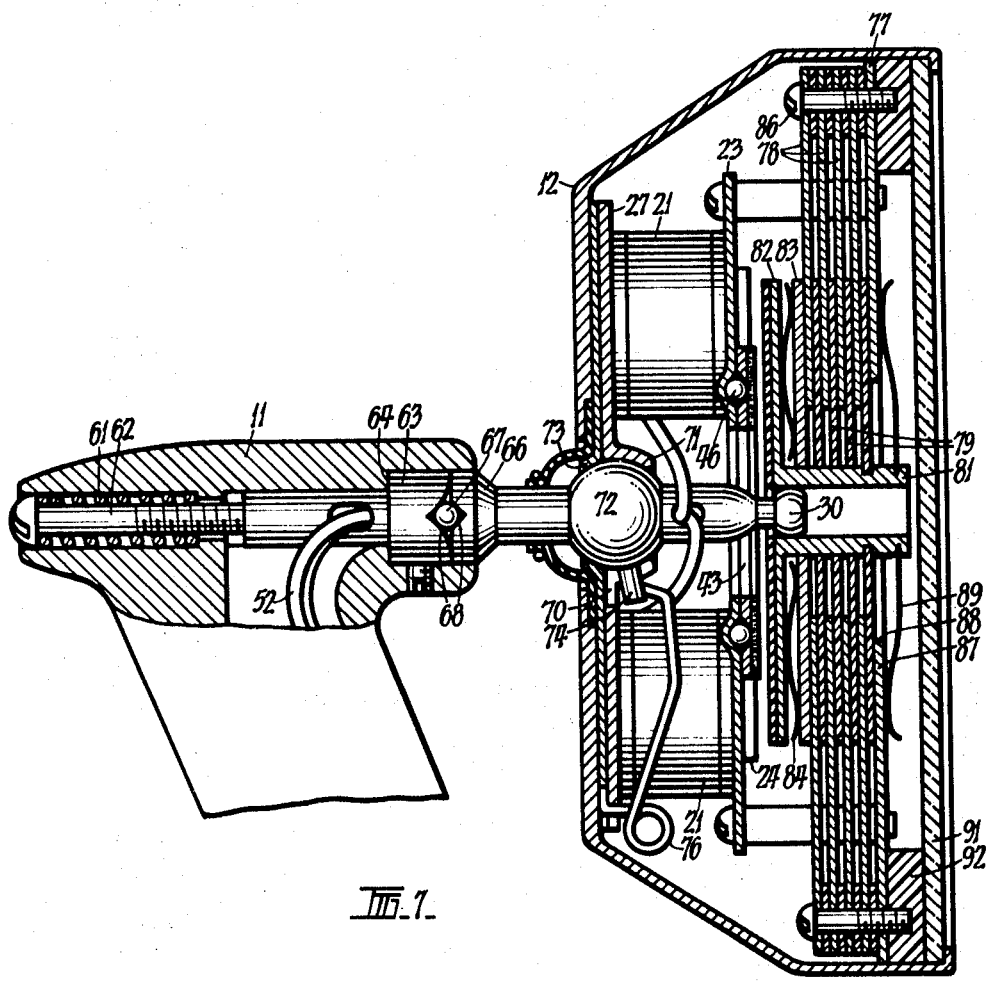
FIG. 7 is a sectional side elevational view of a second embodiment of the invention.

Referring to the embodiment shown in FIG. 7, the electromechanical mechanism is similar to that previously described and corresponding parts will have the same reference numerals. In this embodiment, the spindle 13 has a fixed angular position relative to the mounting support 11 and it is mounted in the mounting support 11 by means of spring 61 and screw 62 which act to pull the spindle 13 into the support 11. Longitudinal movement of the spindle due to the spring 61 is prevented by the sleeve 63 fitted into the support, against a shoulder 64, through which the spindle 13 passes, and the boss 66 fixed to the spindle 13, which engages with the sleeve 63. A number of ball bearings 67 are positioned between the boss 66 and sleeve 63 and seat in grooves 68 formed in the parts. Thus any tendency to rotate the spindle about its axis is resisted by the force of spring 61 maintaining the boss 66 seated on the ball bearings 67.

The mirror mechanism includes the plate 23 and yoke 27 fixed to either end of the cores 22 and coils 21 mounted thereon. The yoke 27 is formed with a centrally located axially extending flange forming a cup 71 for a ball 72 fitted to the spindle 13. A retaining member 73 is attached to the rear surface of the yoke 27 to retain the ball 72 in the cup 71.

A slot is formed in the flange forming the cup 71 and a pin 74 extends from the ball into the slot 70 to prevent rotation of the cup 71 and thus the mirror mechanism about the axis of the spindle 13. A spring 76 fastened at one end to the yoke 27 engages with the pin 74 to provide a biasing force between the spindle 13 and the mirror mechanism.

The mirror head is supported relative to the spindle by friction means which consist of a multidisc magnetically, operable clutch mounted on a mirror support 77 and comprising clutch members 78, static relative to the mirror support 77, and clutch discs 79, movable relative to the mirror support 77, supported coaxially on the boss 81 extending from a thin primary armature disc 82.

The movable clutch discs 79 are located between static clutch members 78, and between the primary armature disc 82 and the outermost static clutch member is a heavier armature 83 spaced from the primary armature disc 82 by a wave or spring washer 84.

The static clutch members 78 are fixed by screws 86 to the rear surface of a mirror support 77 and are formed with large apertures through which the boss 81 passes thereby permitting lateral relative movement of the boss 81 in the planes of the static clutch members 78.

The holes in the movable clutch discs 79 are of dimensions to ensure a close fit of the boss 81 in these holes so that lateral relative movement of the boss causes sliding movement of the movable clutch discs 79 between the static clutch members 78.

The boss 81 extends through a further relatively large aperture 88 in the mirror support 77 and is held therein by a further wave or spring washer 89 which biases the primary armature disc towards the mirror support 77.

A further disc member 85 is fixed to the boss 81 and the wave washer 84 acts to compress the static clutch members 78 and movable clutch members between the armature 83 and the further disc member 85.

The boss 81 is formed with an axial bore with which the ball 30 on the end of the spindle 13 engages.

A mirror 91 is mounted to the mirror support 77 and is spaced therefrom by spacers 92.

A secondary armature member 43 is seated on ball bearings 46 in depressions in the plate 23 between pole pieces 24 as described with reference to the previous embodiment.

It will again be apparent that mirror head including the mirror support 77, the static clutch members 78, the plate 23 carrying the coils 21, and the yoke 27 is, in operation, moved about the ball 72, and the boss 81, relatively movable clutch, movable clutch discs 79, primary armature disc 82 and armature 83 are supported by the spindle 13 relative to the mounting support 11.

In operation, a low voltage is applied to either one or two adjacent coils 21, via the wires 52, so that the secondary armature 43 is attracted toward that one coil or to a position between the two coils. A full voltage is then applied to all the coils simultaneously and the magnetic field produced attracts the primary armature disc 82 and the heavier armature 83 towards the pole pieces 24.

The primary armature disc 82, which is faced with suitable friction material, contacts the secondary armature member 43 and the armature member 83 is then drawn towards armature disc 82 thereby compressing the wave washer 84 and releasing the compressive force holding the clutch members together. The pressure of the primary armature disc 82 and the armature member 83 on the secondary armature 43 causes the ball bearing 46 to reengage in the depressions in the plate 23 and the secondary armature 43 thereby causing a relative movement between the plate 23 and the secondary armature 43. As the secondary armature 43 is frictionally engaged with the primary armature disc 82 which is supported by the spindle 13, the plate 23, and parts connected thereto including the mirror 91, is displaced an amount equal to, and in the direction of the initial displacement of the secondary armature member 43.

Interruption of the current flow to the coils 21 releases the magnetic clutch armatures 82 and 83 and they are moved by the wave washer 89 to clamp the movable clutch discs 79 to the static clutch members 78.

The switching means for controlling the energizing of the coils 21 may be either a manually operated push button switching device which is operable to initially selectively connect two adjacent coils to an electrical supply and then connect all the coils to the supply, or a semiautomatic device operable to selectively apply a low voltage to one or two adjacent coils and after a predetermined time apply full voltage to all coils. Such switching devices may be suitably mounted in a central panel in a vehicle and arranged so that the push button is of a shape similar to that of the mirror and movement of the push button in the desired direction of movement of the mirror causes the mirror to move one step in that direction.

The switching means may also operate through a solid state switching circuit with provision to pulse the mirror to move it quickly from one position to another, which movement may require a number of movements of the mirror mechanism.

Means for preventing voltage feedback, for example, diodes, are preferably arranged in the coil circuits to ensure isolation of the energized coils from the other coils.

It will be appreciated that the invention has been described with reference to its use in a rear vision mirror for a vehicle, the mirror being adapted to be mounted externally of the vehicle driving compartment, and that the invention is also usable in any application wherein a stepped or pulsed movement is required. Thus, for example, the invention is suitable for controlling movement of vehicle headlights or other equipment which it may be desired to be caused to be moved or adjusted, and further, the invention may be modified for use in industrial applications by removing the magnetic armature and spindle and using a strip of material, which it is desired to feed in a predetermined direction, as the armature.

Figure 8:
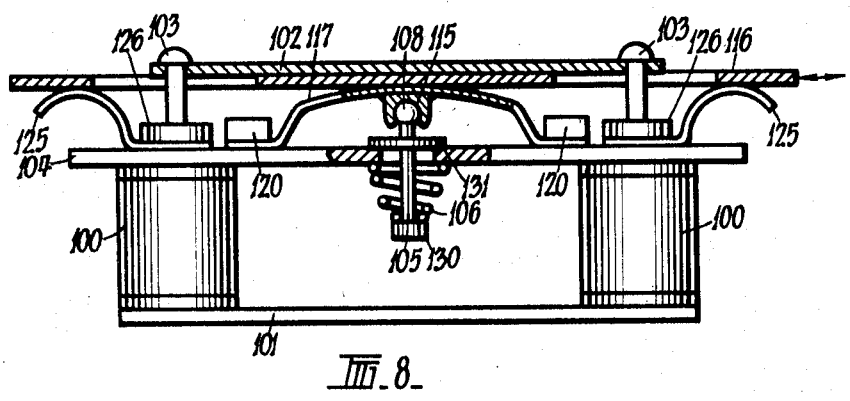
FIG. 8 is a sectional side elevational view showing a third embodiment of the present invention.

Referring to FIG. 8 there is shown a device for imparting motion in two directions to a workpiece 116. The device comprises two coils 100 spaced apart by yoke means 101 and mounted on a plate 104. Pole pieces 126 extend through the plate 104 and a cover plate 102 is provided and held in spaced relationship from the pole pieces 126 by bolts 103. Leaf springs 125 are attached at either end of the plate 104 and are arranged to hold the workpiece 116 in spaced relationship to the plate 104 underneath the cover plate 102.

Mounted in an aperture centrally of the plate 104 is a lever 105 having a ball head 108 at one end thereof and a further head 130 at the other end. The ball head 108 is fitted within a cavity 115 provided in a boss attached to an elongated spring 117. A retaining plate 131 is fixed to the arm 105 and by means of the coil spring 106 the arm is held in the position shown.

Armature pieces 120 of magnetic material, such as soft iron, are attached to the ends of the spring 117 so that when, for example, the right hand coil is energized armature piece 120 adjacent that coil will be attracted thereto pulling the spring 117 therewith and causing the arm 105 to tilt.

Both coils are then energized which causes the workpiece 116 to be drawn downwardly towards the pole pieces 126. The workpiece 116 contacts and compresses the spring 117 between the workpiece and the plate 104 thereby tending to spread the ends apart, but as the right-hand end thereof is engaged with the right-hand pole piece 126 the spring 117 must spread in a direction towards the other pole piece.

As the bottom of the workpiece is frictionally engageable with the center of the spring 117 the workpiece will be moved towards the left-hand pole piece 126.

When the power to both coils is released the leaf springs 125 move the workpiece 116 away from the spring 117 and the spring means 106 associated with the arm 105 centrally locates the spring 117 between the pole pieces.

It will be appreciated that this embodiment may be modified to move the workpiece 116 in two directions at right angles to each other by having two further coils arranged to act on armature pieces 120 at right angles to the direction of the movement induced by the coils 100.

I claim:

1. Apparatus for producing relative motion of a workpiece comprising supporting means, movement transmitting means mounted on said supporting means, means for displacing the movement transmitting means relative to the supporting means, means for moving a workpiece substantially perpendicular to the direction of displacement of the movement transmitting means to engage therewith when the movement transmitting means is so displaced, and means associated with the movement transmitting means to cause relative motion between the supporting means and the movement transmitting means in a direction opposite its displacement when the movement transmitting means is engaged by the workpiece to thereby impart a corresponding relative motion between said workpiece and said support means.

2. Apparatus as claimed in claim 1 wherein the movement transmitting means comprises a plate mounted substantially parallel to and spaced from the supporting means by a plurality of spherical bearings engaged in corresponding depressions formed in the supporting means and the movement transmitting plate, the spherical bearings being adapted to ride up the depressions when the movement transmitting plate is displaced and reengage in the depressions when the movement transmitting plate is engaged by the workpiece.

3. Apparatus as claimed in claim 2 wherein a plurality of electromagnets are mounted on said supporting means with associated pole pieces equispaced around and adjacent said movement transmitting means, and said movement transmitting means includes portions of magnetic material which are attractable towards any one of the pole pieces upon operation of the respective electromagnets to cause displacement of the movement transmitting means relative to the supporting means.

4. Apparatus as claimed in claim 3 wherein said workpiece comprises an armature mounted substantially parallel to but spaced from said supporting means and movable against spring biasing means towards said pole pieces upon simultaneous operation of all the electromagnets, said armature having friction surface means to engage with said movement transmitting means to prevent relative lateral movement therebetween when in engagement.

5. Apparatus as claimed in claim 4 wherein said armature is formed with a centrally disposed aperture to receive a spindle pivotally mounted on a yoke connecting said electromagnets and spaced from said supporting means, and means are provided for fastening a rearview mirror to said support means and further means are provided for supporting said spindle in a rearview mirror support bracket so that relative lateral movement of said armature to said support means causes said mirror to move from one position to another relative to said mirror support bracket.

6. Apparatus as claimed in claim 5 including means for preventing rotational movement of said supporting means relative to the axis of said spindle.

7. Apparatus as claimed in claim 3 wherein said workpiece comprises a magnetic clutch mounted on a frame member fixed to but spaced from said supporting means, said magnetic clutch including a plurality of static clutch members fixed to said frame member and a plurality of movable clutch discs each mounted between a pair of static clutch members and engaged on a boss extending from a primary armature means, resilient means for mounting said boss to said frame member, and releasable means for clamping said static and movable clutch members together and for releasing said clamping action when said primary armature is moved toward and engaged with said movement transmitting plate upon simultaneous operation of the said electromagnets to thereby permit relative lateral movement between said movable and static clutch members.

8. Apparatus as claimed in claim 1 wherein said movement transmitting means comprises an elongated arched spring member having end portions slidably mounted on said supporting member, armature means fixed to each end portion and a pole piece of an electromagnet mounted on the supporting means adjacent each end portion, means for selectively energizing one of the electromagnets to attract one of the armature means to cause the spring member to be displaced from a central position to a position whereat one of the armature means contacts the associated pole piece, and means for simultaneously energizing both electromagnets to move a magnetic workpiece perpendicularly toward the pole pieces to engage and compress said spring member thereby spreading the end portion thereof not engaged against one pole piece toward the other pole piece and simultaneously moving the engaged workpiece in the direction of the other pole piece.

9. Apparatus as claimed in claim 8 wherein resilient biasing means biases said workpiece in a perpendicular direction away from said pole pieces, and guide means are provided to locate said workpiece in a position adjacent to but spaced from said spring member.

10. Apparatus for producing relative motion of a workpiece comprising a supporting member, four electromagnets mounted symmetrically on said supporting member with their cores extending from one side of and perpendicular to the plane of said supporting member, pole pieces on the cores and extending from the other side of the supporting member, a yoke on the free ends of the cores spaced from and substantially parallel to the supporting member, a movement transmitting plate of magnetic material mounted between said pole pieces substantially parallel to the supporting member on four spherical bearings engaged in depressions in both the supporting member and the transmitting plate, spring means supporting said transmitting plate in engagement with said bearings, frame means for supporting said workpiece adjacent to but spaced from said transmitting plate, and means for supplying electrical current initially to at least one of the said coils to produce a magnetic field to attract said transmitting plate toward at least one associated pole piece so that the spherical bearings ride up the depressions, and to then supply electrical current to all said coils simultaneously to produce a magnetic field to attract said workpiece toward said pole pieces so that it engages with said transmitting plate to cause the spherical bearings to reengage in the depressions thereby producing a relative movement between said movement transmitting plate and said supporting member and imparting a corresponding relative movement to the workpiece engaged with the movement transmitting plate.